United States Patent

Harwood

[11] 4,051,521
[45] Sept. 27, 1977

[54] VIDEO AMPLIFIER FOR COMBINING LUMINANCE AND CHROMINANCE SIGNALS

[75] Inventor: Leopold Albert Harwood, Somerville, N.J.

[73] Assignee: RCA Corporation, New York, N.Y.

[21] Appl. No.: 728,171

[22] Filed: Sept. 30, 1976

[51] Int. Cl.$^2$ .............................................. H04N 9/52
[52] U.S. Cl. ................................................... 358/30
[58] Field of Search .......................... 358/30, 40, 184; 330/12, 16, 17, 20

[56] References Cited

U.S. PATENT DOCUMENTS

| 3,663,745 | 5/1972 | O'Toole | 358/30 |
| 3,996,609 | 12/1976 | Avery | 358/30 |

*Primary Examiner*—Robert L. Richardson
*Attorney, Agent, or Firm*—Eugene M. Whitacre; Kenneth R. Schaefer

[57] ABSTRACT

A video amplifier circuit for combining chrominance and luminance signal components and for supplying resultant color representative signals to an image reproducing cathode ray tube comprises first, second and third transistors direct current coupled in series relation with a load circuit across an operating voltage (B+) supply. The first and second transistors are of one conductivity (NPN) while the third is of opposite conductivity (PNP). Luminance signals, which are direct current coupled to the third transistor (a voltage follower), are converted by means of a drive control resistor to provide luminance current drive to the other series connected transistors. Chrominance signals are direct current coupled to the control (base) electrode of the first transistor which operates in conjunction with the second transistor as a cascode voltage amplifier for chrominance signal components. Color signals are direct current coupled from the output of the upper (common base) transistor of the cascode amplifier to the cathode ray tube. The common base transistor is biased at a relatively low voltage to permit use of a relatively inexpensive wide bandwidth device for the lower transistor of the cascode arrangement.

11 Claims, 1 Drawing Figure

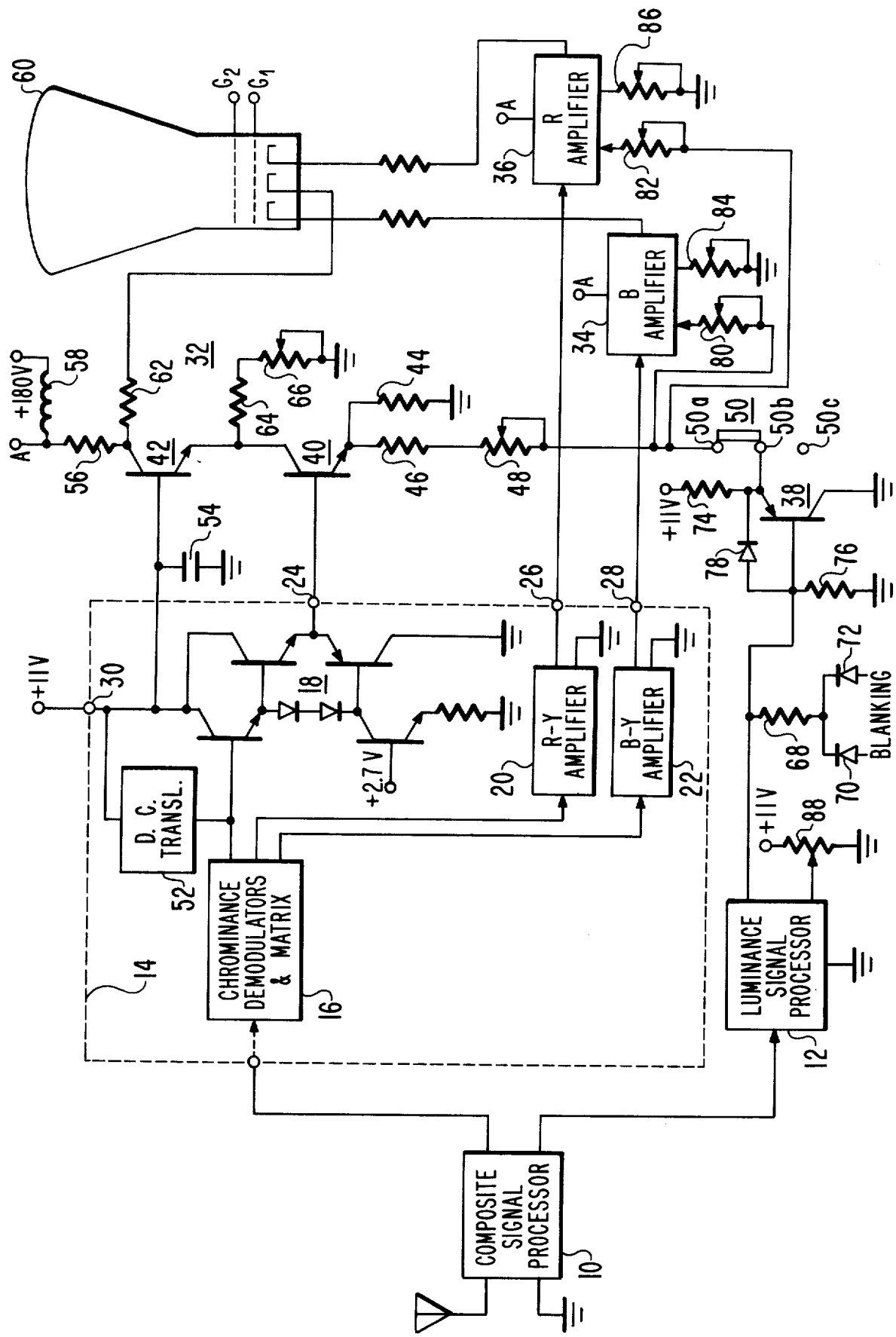

VIDEO AMPLIFIER FOR COMBINING LUMINANCE AND CHROMINANCE SIGNALS

This invention relates to video amplifier circuits and, in particular, to circuits of a type which are suitable for combining luminance and chrominance components of a color television signal and for supplying the resultant color image-representative signals directly to a color image reproducing device such as a cathode ray tube (kinescope).

In the design of color television receivers, it is currently common practice to combine the wide bandwidth luminance signals (Y) and three relatively narrow bandwidth color difference signals (R−Y, G−Y, B−Y) to produce three wide bandwidth color-representative signals (R, G, B) for application, for example, to the corresponding cathodes of the kinescope. Amplifiers which are suitable for producing these latter signals must meet relatively stringent and somewhat conflicting requirements with respect to bandwidth, reverse breakdown voltage, power dissipation, peak to peak signal swing and stability of the D.C. levels associated with each of the color-representative signals. High level D.C. clamping circuits, feedback stabilization networks and additional active devices have frequently been found to be necessary to achieve the desired results.

One approach which has been found to meet a number of the kine driver requirements is described in U.S. Pat. No. 3,499,104 granted to Wayne M. Austin. In the arrangements described by Austin, each of three kine driver amplifiers includes a low voltage, wide bandwidth common emitter device coupled to a high voltage common base device in a cascode configuration. Such cascode amplifiers are capable of providing the desired video bandwidth, signal swing and voltage breakdown requirements while employing economical transistors. However, in the configurations of the Austin patent, when matrixing is performed at the output stage, separate low level luminance and color difference amplifier devices as well as a common base output device are employed in each output stage. In addition, high level D.C. clamping circuits are included to stabilize the D.C. voltage at each output terminal.

Various other stacked or cascode video amplifier arrangements have also been described in, for example, U.S. Pat. No. 3,598,912 — Nillesen; 3,619,486 — Tzakis; 3,764,826 — Okada and 3,823,264 — Haferl. A continuing problem exists, however, in many of these known configurations with regard to power dissipation, D.C. stability, available signal voltage swing and the methods of matrixing chrominance and luminance signals.

A second general type of matrix amplifier suitable for driving a kinescope directly is exemplified by the circuit shown in U.S. Pat. No. 3,663,745 issued to John J. O'Toole. In the O'Toole arrangement, the emitter of a single PNP luminance amplifier transistor arranged in a common collector configuration is direct current coupled to the emitters of three NPN transistors. Color difference signals are supplied to the bases of the three last-named transistors and amplified R, G and B signals are provided across collector loads of those transistors. Other somewhat similar arrangements are shown in U.S. Pat. No. 3,429,987 — Altmann. While the O'Toole and other similar arrangements exhibit many desirable characteristics, the voltage ratings of the output transistors, as well as the power dissipation and D.C. stability characteristics of the amplifiers leave room for improvement.

In accordance with the present invention, a video amplifier suitable for direct coupling of color image-representative signals to an image reproducing device comprises first, second and third semiconductor devices having main current conduction paths direct current coupled in series relation with a load circuit across a direct operating voltage supply. The third device is arranged as a voltage follower to which luminance signals are direct current coupled. Chrominance signals are direct current coupled to the control electrode of the first device which operates in conjunction with the second device as a cascode amplifier with respect to chrominance signals. The luminance signal output of the voltage follower is converted by means of a "drive" resistor to provide luminance signal current drive to the series connected first and second transistors for matrixing with the color difference signals. The cascode amplifier is arranged to operate with a relatively low bias voltage at the control electrode of the second transistor such that a relatively inexpensive, low breakdown voltage device which operates at low quiescent power dissipation may be employed for the first device.

Referring to the embodiment of the invention shown in the drawing, a composite television signal processor 10, suitable for processing television signals representative of color images, provides luminance signal components to a luminance signal processor 12 and provides chrominance signal components to a chrominance signal processor 14 indicated by the dashed outline. In accordance with the current state of the art, chrominance signal processor 14 may be constructed principally in monolithic integrated circuit form and includes chrominance signal demodulators 16 (e.g., "I" and "Q" demodulators) including appropriate mixing or matrixing circuits for providing three color difference signals (G−Y, R−Y and B−Y). The color difference signals are amplified by means of respective like direct coupled amplifiers 18, 20, 22 arranged to exhibit low output impedances at respective output terminals 24, 26, 28. Amplifier 18, as well as the remainder of chrominance processor 14, is supplied via a terminal 30 with a relatively low operating voltage (+11 volts) such as is customarily employed with integrated circuits. The quiescent direct output voltage at terminal 24 is related to the operating voltage provided at terminal 30 by virtue of a direct current coupling, including a D.C. translation network 52 and the base-emitter junctions of intervening transistors of amplifier 18, between terminals 30 and 24. Similar arrangements are associated with each of amplifiers 20 and 22 so that the quiescent output voltages at terminals 24, 26 and 28 all are substantially equal and are directly related to the operating voltage provided at terminal 30. Variations in that operating voltage (if any occur) reslt in substantially equal voltage changes at terminals 24, 26, 28.

Amplified color difference signals provided at terminals 24, 26, 28 are matrixed in respective kinescope driver amplifiers 32, 34, 36 with luminance signals (Y) provided from luminance signal processor 12 via a PNP common collector (voltage follower) transistor 38. While only "green" kine driver 32 is shown in detail, the kine driver amplifiers 32, 34, 36 are substantially alike (with the possible exception of different resistor values to provide different gains for the several color signals) and are all coupled to the emitter of luminance amplifier transistor 38. Amplifier 32 comprises first and second NPN transistors 40, 42 arranged, insofar as the color difference input is concerned, in a cascode configuration. That is, the G−Y color difference signals are applied via terminal 24 to the control electrode (base) of transistor 40 which is arranged as a degenerated common emitter amplifier for color difference signals. Signal degeneration is provided by means of the combination of a bias resistor 44 coupled from the emitter of transistor 40 to ground coupled in parallel with the series combination of a relatively low impedance fixed resistor 46 and a relatively low impedance drive control resistor 48. Resistor 48 is returned to the emitter of luminance amplifier transistor 38 via normally closed contacts 50a and 50b of a service switch 50.

The collector (output) electrode of transistor 40 is directly connected to the emitter of the upper transistor 42 of the cascode driver 32. Transistor 42 is arranged in a common base configuration. A relatively low direct bias supply voltage (the +11 volt supply coupled to chrominance processor 14) is coupled from terminal 30 to the base of transistor 42. A bypass capacitor 54 is coupled across the low voltage supply. Amplified color signals ("G" or green signals) are developed at the collector or transistor 42 across the series combination of a relatively high impedance load resistor 56 and a high frequency peaking coil 58, the latter being coupled to a relatively high direct operating voltage supply (shown as +180 volts). Peaking coil 58 may be coupled in common to the other two kine drivers 34, 36 as indicated by the terminal "A" associated with each driver amplifier.

Amplified color signals are coupled from the collector of transistor 42 to a corresponding cathode of an associated image reproducing kinescope 60 via a series resistor 62. As illustrated, the kinescope 60 may be of the precision-in-line (PI) type in which separate cathodes are provided for each of the three electron guns but the first control grid ($G_1$) and screen grid ($G_2$) structures are common to all three guns.

In order to permit adjustment of the cutoff level of each of the electron guns (which may vary by approximately 50 volts from gun to gun in a PI tube), a variable bias control resistor 66 is coupled from the emitter of common base transistor 42 to ground by means of a series resistor 64.

In the luminance signal processing chain, provision is made for supplying horizontal and vertical blanking signals via a resistor 68 and diodes 70 and 72, respectively, to the base of PNP transistor 38. Such blanking signals may be derived in a known manner from associated deflection circuits (not shown) in the receiver. Luminance signals, including a direct voltage component which may be adjusted by means of a brightness control 88, which is coupled across the low voltage supply, are direct current coupled from luminance signal processor 12 to the base of transistor 38. The direct voltage component of the luminance signal is thus related to the low voltage supply (+11 V) level.

Direct operating voltage also is supplied from the low voltage supply (+11 V) via a load resistor 74 to the emitter of PNP transistor 34, the collector of which is returned to ground. A diode 78 is coupled between the base and emitter of transistor 38 and is poled to limit positive excursions of the blanking pulses.

Blue (B) kine driver amplifier 34 and red (R) kine driver amplifier 36, like green (G) kine driver amplifier 32, are coupled to the emitter of luminance amplifier transistor 38 via respective adjustable drive control resistors 80, 82. Furthermore, respective bias control resistors 84, 86 are associated with the emitters of the common base stage (not shown) in each of the amplifiers 34, 36.

Prior to normal operation of the system, quiescent operating conditions are adjusted by placing service switch 50 in the "SERVICE" position (i.e., by connecting terminal 50b to terminal 50c and thereby disconnecting terminal 50a). The emitter of transistor 38 and the luminance signal input are thereby disconnected from the inputs of kine drivers 32, 34, 36. As is customary, service switch 50 also preferably includes additional contacts (not shown) arranged to interrupt operation of an associated vertical deflection system (not shown), thereby collapsing the raster to produce only a single horizontal line on the face of kinescope 60 in the "SERVICE " mode. Bias control rsistors 66, 84 and 86 are adjusted one at a time to vary the direct voltage at the outputs of kine drivers 32, 34 36 and thereby set each of the electron guns of kinescope 60 just at cutoff in the absence of luminance signal drive. The color difference signal amplitudes at the terminals 24, 26, 28 (normally in the range of three volts peak to peak) preferably are adjusted at this time to zero level by means of an associated color or chroma level control (not shown) coupled to chrominance processing circuits 14. The normal quiescent direct voltages provided at terminals 24, 26, 28 (e.g., approximately +5 volts) will then be coupled to the lower transistors of each of the cascode amplifiers 32, 34, 36.

It should be noted that, by virtue of the connection of each of the bias control resistors (e.g., 66) to the emitter electrode of the associated common base transistors (e.g., 42) in the kine driver amplifiers 32, 34, 36, there will be no interaction among the three bias controls. That is, the common emitter transistors (e.g., 40) isolate the three bias controls from each other and permit independent adjustment of cutoff of each of the three guns. Furthermore, adjustment of the bias control (e.g., 66) will change the direct current in the associated common base transistor (e.g., 42) and therefore will change the direct voltage at its collector but will have substantially no effect upon either the voltage at the collector of the associated common emitter transistor (e.g., 40) or the quiescent current through that latter transistor. The collector voltages of the common emitter transistors are fixed by the relatively low voltage supply coupled to the bases of the upper transistors of the cascode arrangements. Thus, adjustment of the bias controls will not change the quiescent power dissipation (or the temperature dependent base-emitter voltage) of the associated common emitter transistor in any significant manner. It is therefore possible to adjust the bias control resistors in rapid sequence without any waiting time to allow for thermal drift of the circuits to stabilize.

It should also be noted that the collector voltage of the lower transistor (e.g., 40) of the cascode amplifier (e.g., 32), besides being relatively fixed by virtue of the common base stage (e.g., 42) to which it is coupled, is also only a small fraction (of the order of 1/20th) of the operating supply voltage associated with the output signal. Thus, the common emitter transistor need only be selected to sustain a relatively low reverse breakdown voltage (the common base transistor is selected to have a higher breakdown voltage). A wide bandwidth device may therefore be provided at reasonable cost for the common emiter amplifier device. If desired, the device may be selected primarily with regard to the narrow bandwidth color difference signals since, with regard to the wideband luminance signals, this device (e.g., 40) operates as a common base stage. Furthermore, since the voltage provided at the base of the common base device (e.g., 42) of each amplifier is derived from the same supply as is coupled to the preceding chrominance processor 14, the peak signal swing provided at the base of the common emitter stage (e.g., 40) will be related to the collector supply voltage of that device. In this manner, minimum collector voltage requirements may be realized without introducing distortion in the chrominance signals.

Maximum current levels of the order of fifteen to twenty milliamperes need only be carried by the main current conduction (emitter-collector) paths of the devices in each cascode arrangement. The resulant relatively low power dissipation levels in the lower devices (e.g., 40) result in relatively stable operation (i.e., low thermal variations in base-emitter voltage of the common emitter devices and therefore low variations in the direct output voltages coupled to the kinescope 60 as a result of changing signal levels). The relatively high voltage common base devices (e.g., 42) are current driven and therefore do not contribute to drift of the output.

After adjustment of the bias controls 66, 84, 86, the service switch 50 is again returned to normal position and the color control (not shown) is returned to a normal operating level. Each of the drive controls 48, 80, 82 is then adjusted in turn to provide appropriate highlight white balance in the conventional manner making use of brightness control 88.

The signal voltage gain characteristics of each of the kine driver amplifiers 32, 34 36 is determined by the ratio of the associated collector load impedance (e.g., resistor 56) compared to the associated emitter resistance (e.g., the sum of resistor 46 and adjustable drive control 48).

In view of the relative stability of the amplifiers and lack of $V_{be}$ variation of the common emitter transistors 40 as a result of operating with low power dissipation, it is possible to utilize only a small degree of degeneration in the amplifier, i.e., the sum of resistors 46 and 48 may be relatively low. The illustrated amplifier therefore may be arranged to provide a substantial amount of the overall system voltage gain. Stated differently, the preceding luminance and chrominance processors 12, 14 may be relatively low gain, low output signal level arrangement.

In the operation of the illustrated apparatus, color difference signals (G−Y, R−Y, B−Y) are supplied at the low impedance output terminals 24, 26, 28 of amplifiers 18, 20, 22 to the control electrodes (bases) of the three NPN common emitter transistors (e.g., 40) in kine driver amplifiers 32, 34, 36. The luminance signal (with sync tips positive) is supplied in common via the main current (collector-emitter) path of transistor 38 and service switch 50 to the drive control resistors 48, 80 and 82. Color signal voltages (G, R, B) are developed across series resistors coupled between the emitters of the common emitter transistor (e.g., 40) in each driver amplifier and the emitter of PNP transistor 38. The color signal currents developed in each of the emitter resistors 48, 80 and 82 flow through the current paths of the associated lower transistor (e.g., 40) and common base transistor (e.g., 42) to the collector load resistor (e.g., 56). The resultant amplified color signals (G, R, B) are coupled to the respective cathodes of kinescope 60.

A system employing three amplifiers of the illustrated type has been found to be substantially free of differential D.C. drift and therefore substantially free of colorimetric shifts either as a result of operating temperature variations or expected supply voltage variations. Furthermore, in view of the fact that the direct current components of both the luminance and chrominance signals are related to the same direct voltage supply (+11 V) and that variations in such direct components tend to cancel across the drive resistors (e.g., 48) in the illustrated arrangement, common mode D.C. stability of the amplifiers has also been found to be acceptable.

An additional operational advantage of the illustrated configuration occurs in the event of arcing in kinescope 60. The incorporation of the common base stages (e.g., 42) aids significantly in reducing the coupling of energy from such arcs to the preceding amplifiers (e.g., in chrominance processor 14).

While the invention has been described in terms of a preferred embodiment, it should be recognized that various modifications may be made without departing from the scope of the invention.

One suitable arrangement of the illustrated configuration may be constructed employing components with the following values.

| | |
|---|---|
| Resistor 44 | 3,300 ohms |
| Resistor 46 | 68 ohms |
| Resistors 48, 80, 82 | 100 ohms (variable) |
| Resistor 56 | 10,000 ohms |
| Resistor 62 | 2,000 ohms |
| Resistor 64 | 1,000 ohms |
| Resistors 66, 84, 86 | 25,000 ohms (variable) |
| Resistor 68 | 10,000 ohms |
| Resistor 74 | 3,300 ohms |
| Resistor 76 | 10,000 ohms |
| Resistor 88 | 10,000 ohms (variable) |
| Capacitor 54 | 0.01 microfarads |
| Inductor 58 | 270 microhenries |

What is claimed is:

1. In a color television receiver, a video amplifier circuit for combining chrominance and luminance signal components and for supplying resultant color representative signals to an image reproducing device comprising:

means, having at least first and second terminals, for providing a direct operating voltage;

chrominance signal amplifying means comprising at least one amplifier section including a load circuit, first and second semiconductor devices of a first conductivity type, each having a control electrode and a main current conduction path associated with said control electrode, said conduction paths of said first and second devices and said load circuit being direct current coupled in series relation to said first terminal, and means for coupling a source of direct bias voltage less than said operating voltage to said control electrode of said second device;

luminance signal amplifying means comprising a third semiconductor device of a second conductivity type arranged in a voltage follower configuration and having a main current conduction path direct current coupled to said second terminal and a control electrode associated with said path;

a source of chrominance signals;

a source of luminance signals;

means for direct current coupling said chrominance signals to said control electrode of said first device such that said first and second devices operate as a cascode amplifier for said chrominance signals;

means for direct current coupling said luminance signals to said control electrode of said third device;

means for direct current coupling said main current conduction paths of said first, second and third devices in series relation with said load circuit between said first and second terminals such that a combination of chrominance signals, luminance signals and associated direct current components is produced in said main current paths of said first and second devices; and means for direct current coupling output signals from said load circuit to said image reproducing device, whereby amplified color representative signals including direct current components are provided to said image reproducing device.

2. A video amplifier according to claim 1, wherein:
means are provided for direct current coupling said source of direct bias voltage to said luminance signal amplifying means, whereby variations in said bias supply voltage coupled from said luminance signal amplifying means are of a sense to cancel such variations coupled from said chrominance signal amplifying means to said load circuit.

3. A video amplifier according to claim 1, wherein:
said chrominance signal amplifying means further comprises means coupled to said series coupled current paths of said first and second devices at a point between said last-named devices for varying a direct voltage component of said output signals and thereby controlling black level of said signals.

4. A video amplifier according to claim 1, wherein:
said chrominance signal amplifying means further comprises second and third amplifier sections each including a load circuit, first and second semiconductor devices of a first conductivity type, each of said devices having a control electrode and a main current conduction path, said conduction paths of said first and second devices and said load circuit of each amplifier section being direct current coupled to said first terminal and said source of direct bias voltage is coupled to said control electrode of each of said second devices;

said source of chrominance signals provides at least three color difference signals;

means are provided for coupling individual ones of said color difference signals to a separate one of said control electrodes of said first devices; and said main current path of said third semiconductor device of said luminance signal amplifying means is direct current coupled in series relation with each of said devices of said chrominance signal amplifier sections.

5. A video amplifier according to claim 4, wherein:
each of said chrominance signal amplifying sections further comprises means coupled to said series coupled current paths of said first and second devices at a point between said last-named devices for varying a direct voltage component of said output signals and thereby controlling black level of said signals.

6. A video amplifier according to claim 5, wherein:
each of said means for varying a direct voltage component of said output signals comprises a variable resistor direct current coupled from a junction between said first and second devices of a respective amplifier section to said second terminal.

7. A video amplifier according to claim 4, wherein:
means are provided for direct current coupling said source of direct bias voltage to said luminance signal amplifying means, whereby variations in said bias voltage coupled from said luminance signal amplifying means are of a sense to cancel such variations coupled from said chrominance signal amplifying means to said load circuit.

8. A video amplifier according to claim 7, wherein:
each of said chrominance signal amplifying means further comprises means coupled to said series coupled current paths of said first and second devices at a point between said last-named devices for varying a direct voltage component of said output signals and thereby controlling black level of said signals.

9. A video amplifier according to claim 4, wherein:
each of said first and second devices comprises an NPN transistor, said third device comprises a PNP transistor, each said control electrode corresponds to a base electrode and each said main current path corresponds to an emitter-collector path.

10. A video amplifier according to claim 9, wherein:
each said first device is a relatively low breakdown voltage device and each said second device is a relatively high breakdown voltage device.

11. A video amplifier according to claim 10, wherein:
the maximum signal swing of said chrominance signals is determined by said direct bias voltage.

* * * * *